O. THIEME.
CALCULATING MACHINE.
APPLICATION FILED APR. 23, 1917.
1,293,981. Patented Feb. 11, 1919.
5 SHEETS—SHEET 1.
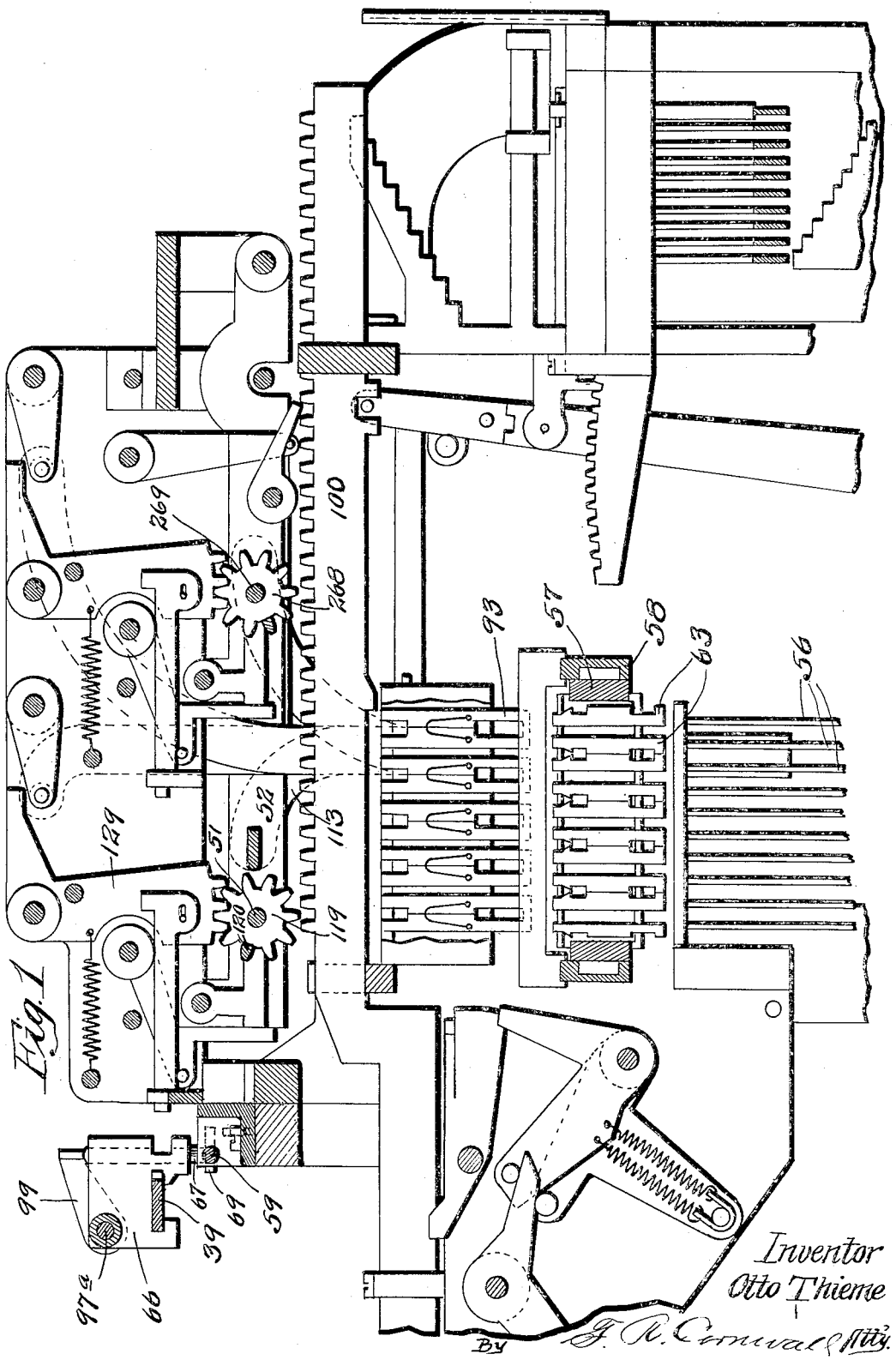
Inventor
Otto Thieme O. THIEME.
CALCULATING MACHINE.
APPLICATION FILED APR. 23, 1917.
1,293,981.
Patented Feb. 11, 1919.
5 SHEETS—SHEET 2.
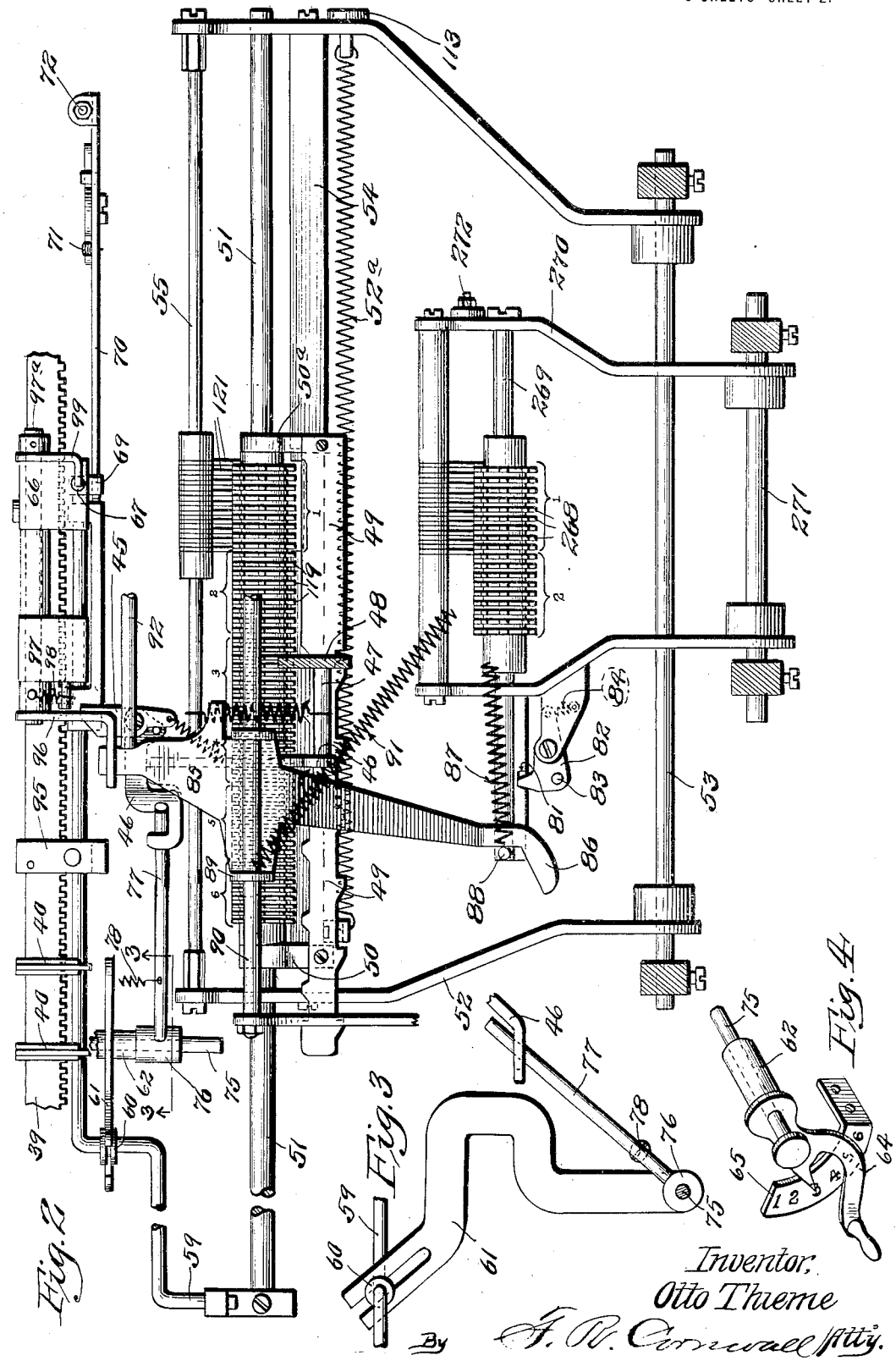
Inventor:
Otto Thieme

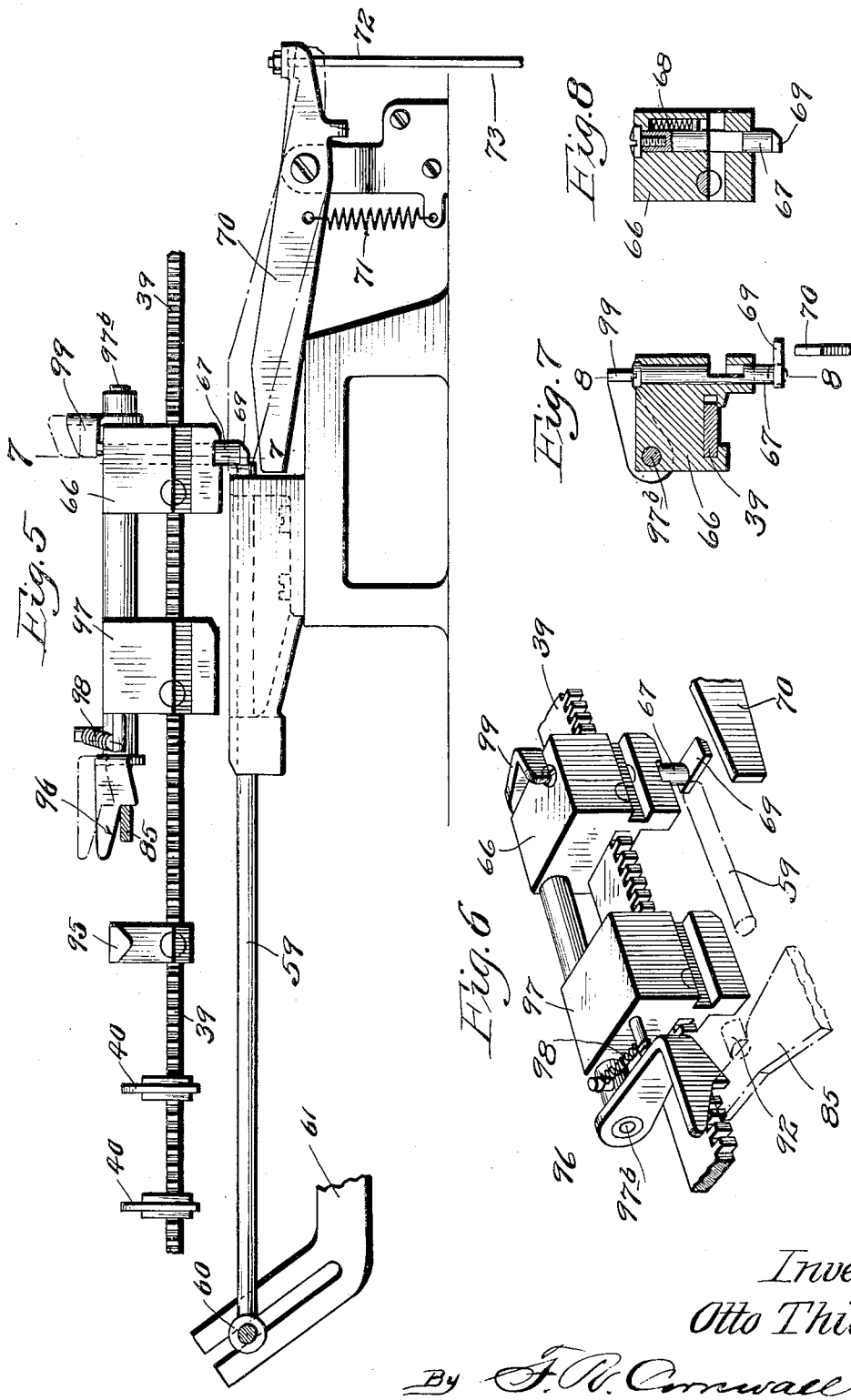

O. THIEME.
CALCULATING MACHINE.
APPLICATION FILED APR. 23, 1917.
1,293,981.
Patented Feb. 11, 1919.
5 SHEETS—SHEET 4.
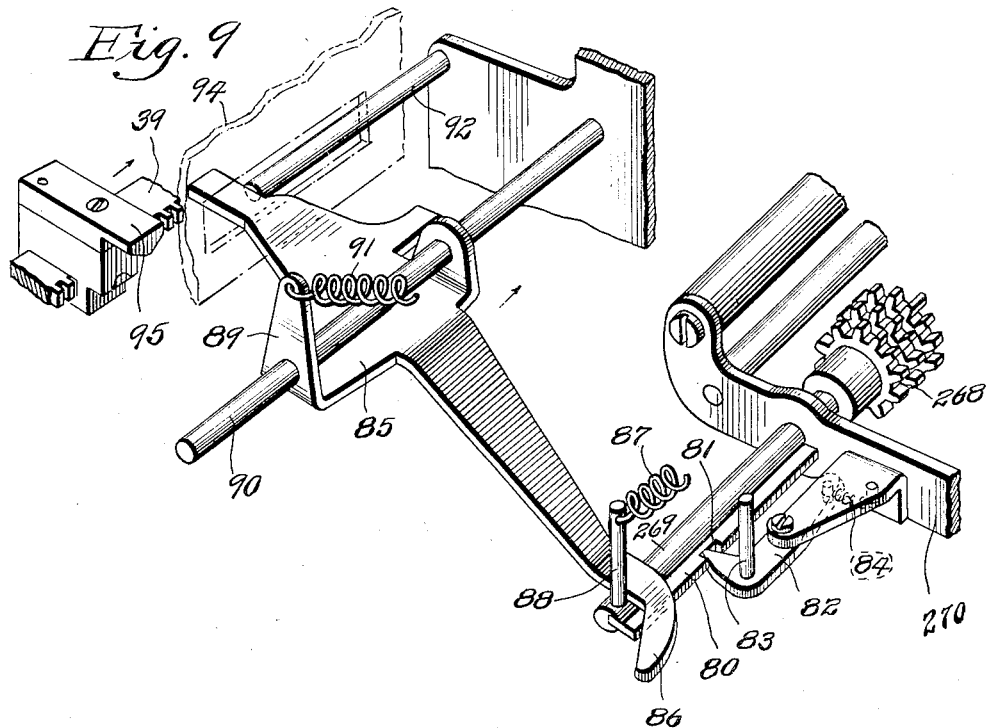
Fig. 9
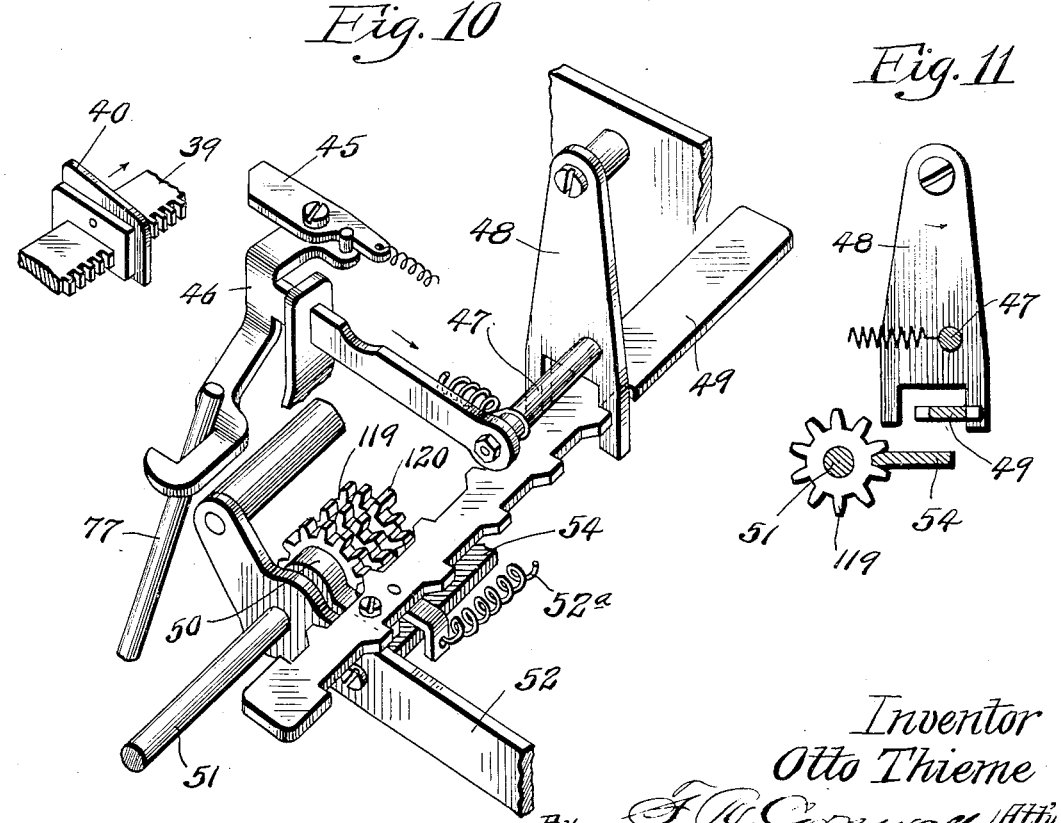
Fig. 10
Fig. 11
Inventor
Otto Thieme
By F. R. Cornwall Atty O. THIEME.
CALCULATING MACHINE.
APPLICATION FILED APR. 23, 1917.
1,293,981.
Patented Feb. 11, 1919.
5 SHEETS—SHEET 5.
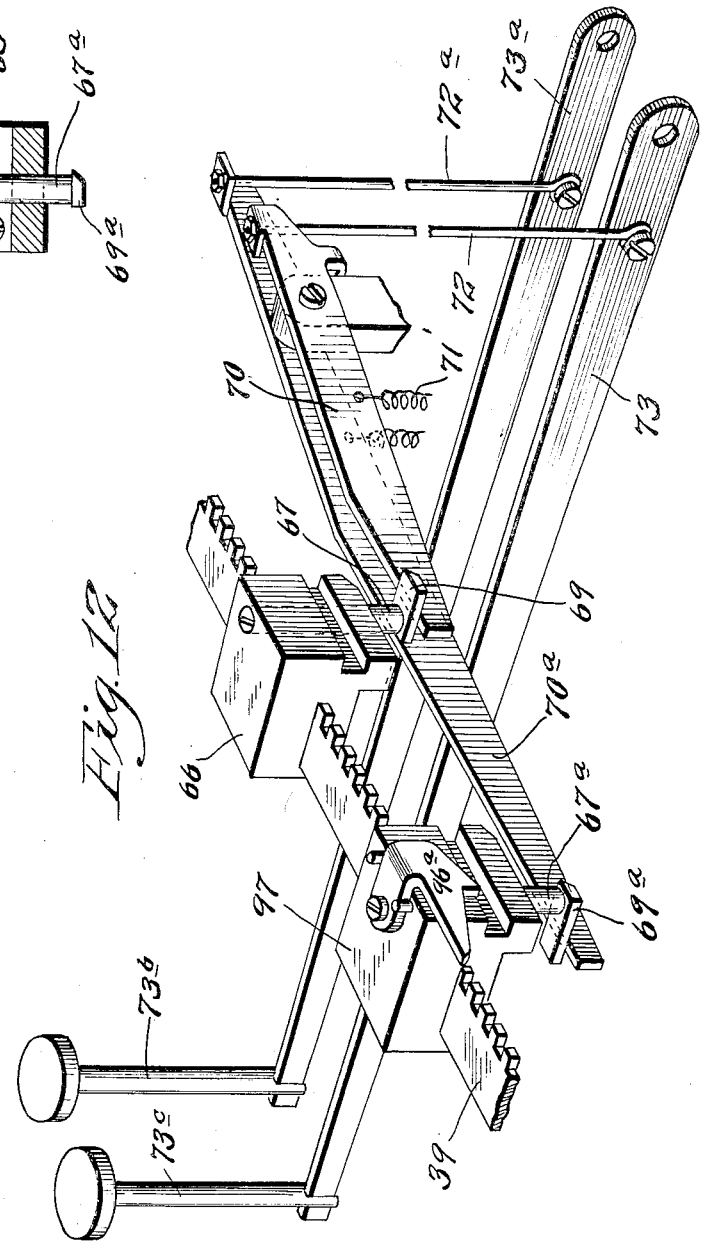
Inventor,
Otto Thieme
By J. R. Cornwall Atty.

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,293,981.      Specification of Letters Patent.      Patented Feb. 11, 1919.

Application filed April 23, 1917. Serial No. 163,359.

*To all whom it may concern:*

Be it known that I, OTTO THIEME, a citizen of the United States, residing at city of St. Louis, State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a vertical sectional view through my improved calculating machine;

Fig. 2 is a top plan view of the totalizer sections;

Fig. 3 is a detail view on line 3—3 of Fig. 2;

Fig. 4 is a detail view of the manually operable handle for the forward totalizer sections;

Fig. 5 is a rear elevational view illustrating the tripping blocks carried by the paper carriage;

Fig. 6 is a detail view of certain of the tripping blocks shown in Fig. 5;

Fig. 7 is a sectional view on line 7—7 of Fig. 5;

Fig. 8 is a sectional view on line 8—8 of Fig. 7;

Fig. 9 is a detail view of the escapement mechanism for the rear totalizers;

Fig. 10 is a detail view of the escapement mechanism for the forward totalizers;

Fig. 11 is a detail side elevational view of the escapement lever for the forward totalizers;

Fig. 12 is a detail view of a modified form of disabling mechanism for the front and rear totalizers;

Fig. 13 is a sectional view showing the detail of the disabling mechanism for the rear totalizers.

This invention relates to a new and useful improvement in calculating machines of the type shown in Belgium patent to Hubert Hopkins, No. 202,081, dated August 21, 1907, and also in an application serially numbered 310,739 filed by said Hubert Hopkins in the United States Patent Office on or about April 9, 1906.

One of the objects of the present invention is to increase the number of totalizers in machines of the type disclosed in said Belgium patent and United States application above referred to. In the present application, there are eight separate totalizer units, but it is obvious that this number may be increased or diminished as occasion demands, the range of increment, however, depending largely upon the number of register wheels constituting a totalizer unit.

Another object of the present invention is to divide the groups of totalizer wheels so that two or more of such totalizer units may be operated simultaneously with each other or at different times with relation to the other series or group. In this way it is possible to utilize one unit for multiplying and subtracting computations and another unit in the same series as the grand totalizer, these two units, constituting the rear group of totalizer wheels in the present instance, being respectively placed under control of the actuating devices either by the movement of the paper carriage, or at the will of the operator, as may be desired. The forward group of totalizer wheels is likewise under control of the paper carriage which in its movement will successively bring the totalizer units under control of the actuators or a selected unit of the totalizer wheels may be placed under control of said actuators at the will of the operator. The paper carriage referred to is designed when it is moved to the right, or at the starting point as in ordinary typewriting machines, to automatically restore both groups of totalizer units to the right so as to place the register wheels constituting a totalizer unit at the extreme left of each group in position to coöperate with the actuating devices. Adjustable blocks are mounted on the paper carriage for operating the escapement mechanisms of the front and rear groups of totalizer units whereby they will successively be brought into coöperative relation to said actuating devices. Said adjustable blocks, however, may be removed for certain operations of the machine, or slid along their supporting bar whereby a selected totalizer unit may be brought into operative relation to the actuating devices by the operator. While the restoration of the paper carriage to its starting point at the right will, in the present machine, normally restore the totalizer units, (unless, of course, the restoring members are moved to one end of their supporting bar, or removed,) means is provided for disabling the restoring mechanism for the totalizer units, so that the movement of the paper carriage to the right or to its starting position, will not necessarily restore either or both groups of totalizer wheels; hence the totalizer unit at the righthand side of the rear group may remain in coöperative relation to the actuating devices and be in position to have transferred thereinto the totals from all of the totalizer units constituting the forward group, this righthand totalizer unit in this operation thus becoming a grand totalizer. By moving the rear group of totalizer units and bringing the lefthand unit into coöperative relation with the actuating devices, multiplication or subtraction may be performed without disturbing the total of the items introduced into the righthand unit. The products or remainders thus obtained in the lefthand rear totalizer unit may be transferred to and accumulated in a forward totalizer unit and thence transferred back to the righthand rear totalizer unit.

The above illustration is only one of many adaptations and uses incident to the employment of a plurality of independently positioned totalizer units having the capacity of transferring a number from one to the other. While I have specified certain totalizer units as those located at the righthand side or lefthand side of the forward or rear group, it is obvious that the order of operation mentioned may be reversed or changed in any way according to the desires of the operator or the demands of the computation being performed.

In the drawings, I have not shown the typewriting mechanism or the keyboard of the adding machine department thereof, as these will be well understood by reference to the patent and application above referred to to which may be added the Hubert Hopkins United States Patent No. 1,118,489, dated November 24, 1914. Indeed, this last mentioned patent shows and describes the manual control of the forward totalizer units substantially the same as is illustrated in the present application.

In the drawings, 56 illustrates the bars which are positioned by the keys to raise pins 63 in the carriage 57, which carriage moves laterally in a track 58 and is raised to position stop pins 93 in a stationary field of stops, which stop pins 93 control the excursions of the racks 100.

39 indicates a bar supported upon and movable with the paper carriage, which bar is provided with a series of adjustable stops 40. The construction of these stops is unimportant as they may be of any form of construction, their function, however, being to engage, on the leftward movement of the paper carriage the inclined face of the tappet 45, which tappet (see Fig. 10) is mounted upon a bar 46, said bar being connected by a post 47 to a swinging escapement lever 48. This escapement lever coöperates with the teeth of escapement bar 49 secured to a block 50 pivotally mounted on shaft 51. The tappet 45 above referred to is pivotally mounted on the outer end of bar 46 and when the carriage with its bar 39 is moved leftwardlly, or in the direction of the arrow shown in Fig. 10, the adjustable stop 40 engaging the inclined face of tappet 45 will move the bar 46 rearwardly and rock the escapement lever 48. This permits the bar 49 to move leftwardly under the impelling action of spring 52. The lefthand end of bar 49 is secured to a block 50ª also mounted on the shaft 51, and between these blocks the totalizer wheels 119 (hereafter referred to as the forward totalizers) are strung on said shaft 51, being loosely mounted thereon. The blocks 50 and 50ª are fixed to shaft 51 and consequently move with said shaft.

In the particular form of my invention illustrated in the accompanying drawings, each totalizer unit of the forward group of totalizer wheels comprises nine register wheels, each of said register wheels, except the one of highest order in each unit, being provided with a tripping projection 120, as shown in Fig. 10, for coöperating with the carrying mechanism shown in Fig. 1 and which may be of the usual construction employed in connection with the beforementioned patents and which need not therefore be described in detail here.

The shaft 51 is mounted to slide longitudinally in frame 52, said frame being pivotally mounted on the shaft 53, the bar 54 constituting a lock for the forward register wheels when the same are not in operative relation to the racks 100, in which position the bar 54 is notched, as shown in Fig. 2, so as to release said register wheels and permit their rotation. The forward end of frame 52 carries a rod 55 on which are mounted the tripping pawls 121 of the carrying mechanism. The bar 113 is connected to frame 52 for vibrating said frame and effecting the engagement and disengagement of the wheels 119 with the racks 100 and carrying segments 129 in the manner described in said beforementioned patent and application.

59 indicates a rod secured to the righthand end of shaft 51 as seen from the front end of the machine, which rod is provided with a jog or bend, shown in Fig. 2, to afford a mount for collars 60 between which collars is arranged the slotted end of a rocking lever 61. This rocking lever is mounted on a sleeve 62 whose forward end is provided with a handle 64 (see Fig. 4) which handle has an indicating pointer coöperating with an indicating scale 65 bearing characters such as numerals from 1 to 6, in the present instance, indicating which unit of the forward totalizer wheels is in operative relation to the rack bars. When the handle is turned from any position back to 1, it will restore the units of the forward totalizer wheels 119 to their starting position independently of any operation or movement of the paper carriage. In this restoration of the forward totalizer wheels to their extreme position to the right, as seen from the front of the machine, the tappet 45 will yield to permit the passage of the blocks 40 therebeyond without vibrating the bar 46.

I do not in this application claim the method of manually controlling the forward totalizers either to step the same leftwardly, or to restore them to their starting position at the right, as the same is set forth in Hubert Hopkins Patent No. 1,118,489 dated November 24, 1914.

66 indicates a block on the bar 39 which as shown in Figs. 5 and 6, contains a pin 67 normally held downwardly in the path of the end of the rod 59 by means of a spring 68 (see Fig. 8); thus, whenever the carriage is moved toward the right and the forward totalizer wheels are in a leftwardly disposed position the pin 67 will engage the end of rod 59 and restore the totalizers. Pin 67 is provided with a plate 69 at its lower end to broaden its face laterally and under one end of this extended plate or block is located the end of a lever 70, to one side of the plane of the rod 59 (see Fig. 7). This lever 70 is pivotally mounted to a bracket on the frame of the machine and has its inner end normally depressed by means of a spring 71, the outer end of said lever being connected by a rod 72 to a key bar 73, upon the forward end of which key bar is arranged a key in the keyboard of the machine. Upon the operation of lever 70, as by raising the inner end thereof, the pin 67 will be raised out of path of rod 59 and thus said rod and the forward group of totalizer wheels 119 may be spaced leftwardly independently of any movement of the paper carriage. When the lever 70 is released it will drop to the position shown in full lines in Fig. 5, or if the rod 59 has been advanced under the pin 67, said pin will be held elevated by riding upon the rod. In order to vibrate the escapement lever 48 to space the totalizer wheels leftwardly when the paper carriage remains stationary, I provide a push rod 75 having a button at its forward end (see Fig. 4), and which push rod passes through the sleeve 62 and is provided with a collar 76 on its inner end to which collar is arranged an arm or finger 77. The upper end of this arm or finger engages in a recess in an extension of bar 46 (see Figs. 2 and 10) whereby when the push rod 75 is moved rearwardly and released, the plate 48 will be vibrated. A suitable spring 78 is connected to the finger 77 so as to pull the rod 75 forward.

268 are the rear totalizer wheels, in this instance constituting two units, said totalizer wheels being mounted on shaft 269 slidably arranged in a swinging frame 270 mounted on a shaft 271. This frame is raised and lowered by means of a rod 272 in a manner similar to that shown and described in the patent and application herein referred to.

The shaft 269 is provided with a plate 80 movable therewith, said plate having a notch 81 with which coöperates a restraining pawl 82 mounted on a suitable bracket secured to the frame 270, as shown in Fig. 9. 83 indicates a pin or post extending up from the hooked end of pawl 82. 84 indicates a spring for yieldingly holding the pawl 82 in operative engagement with respect to plate 80. 85 indicates a bar having a curved inner end 86 which, when said bar is moved in the direction of the arrow shown in Fig. 9, it will contact with post 83 and operate pawl 82 to release shaft 269 and permit said shaft with its carried totalizer wheels to move leftwardly under the impelling action of spring 87. Spring 87 is connected to the upper end of post 88 extending up from shaft 269 and when the bar 85 moves in the opposite direction, it will carry with it shaft 269 and the totalizer wheels 268, positioning them to the right, in which righthand position, as seen from the front of the machine, they are held by the pawl 82 as shown in Figs. 2 and 9.

The bar 85 is provided with lugs or ears 89 which are formed with openings to receive the supporting and guiding rod 90 secured to the frame of the machine. 91 indicates a spring whose energy is exerted to move the bar 85 along rod 90 in the direction of the arrow in Fig. 9.

92 indicates a post secured to the frame of the machine which post serves as a stop to the forward end of bar 85. 94 indicates a part of the front frame plate of the machine, shown in dotted lines in Fig. 9, which is provided with a slot through which the front end of bar 85 passes and operates. When the bar 85 is in the position shown in Fig. 9, its forward end will be raised by the spring 91 against the upper wall of the slot which serves as a stop therefor and when so raised the forward end of bar 85 will occupy a position to the right of post 92 in which position it will be held until the forward end of said sliding bar is depressed. The means for depressing the forward end of bar 85 comprises a cam block 95 adjustably mounted on the notched bar 39 of the paper carriage. When the carriage is moving leftwardly, block 95 having been previously adjusted to the desired point, will in the travel of the carriage engage the forward end of bar 85 so as to depress the same. When depressed below the end of post 92, spring 91 will exert its energy and move bar 85 in the direction of the arrow until the cam end 86 strikes the pin 83 operating the pawl 82 and releasing the shaft 269 in which operation the wheels 268 will be positioned at the left. The means for restoring the bar 85 and the wheels 268 to the right to starting position comprises a shouldered arm 96 (see Figs. 2 and 5), which shouldered arm is mounted upon a rock shaft 97$^a$ having bearings in the block 66, heretofore described, and a companion block 97. Spring 98 tends to hold the shouldered end of rock arm 96 in its lowered position whereby the shoulder thereof will engage and restore the bar 85 when the paper carriage is moved to its starting position at the right. There may be occasions, however, where it is desired to permit the rear totalizer wheels to remain in their position to the left at the time that the paper carriage is being returned to its starting position at the right. I therefore provde a rock arm 99 on the opposite end of rock shaft 97$^a$ and which arm 99 has a bent portion extending over the pin 67, heretofore described. When pin 67 is raised, it will thus rock shaft 97$^a$ and raise the hooked arm 96 so that its shoulder lies in a plane above the forward end of bar 85, and consequently when the paper carriage is restored to its position at the right, wheels 268 will remain in their position at the left. Of course during this restoration of the paper carriage to its position at the right, the key which operates the lever to lift the pin 67 must be held depressed.

While I have shown the hooked rock arm 96 as being dependent for its operation upon the lifting of the pin 67 included in the disabling means with the forward totalizers, it is obvious that a separate key operated lever may be provided for the shoulder restoring member for the rear totalizers, as shown in Fig. 12, wherein the shoulder restoring member 96$^a$ is mounted on a pin 67$^a$ corresponding to the pin 67 and which is held downwardly by means of a spring 68$^a$ (see Fig. 13).

There is a lever 70$^a$ pivotally mounted on the bracket on which the lever 70 is mounted, said lever being connected by a rod 72$^a$ to a key bar 73$^a$ on the forward end of which key bar, as in the case of the key bar 73, there is a key 73$^b$. The block or plate 69$^a$ on the lower end of the pin 67$^a$, is preferably extended forwardly, or in an opposite direction from the block 69, so that it will not interfere with the restoring rod 59 of the forward totalizers.

By the construction illustrated in Figs. 12 and 13, if it is desired to disable the restoring mechanism for the rear totalizers, the key 73$^b$ is held depressed when the paper carriage is being moved to its starting point at the right. If it is desired to disable the restoring mechanism for the forward totalizers, the key 73$^c$ is held depressed while the paper carriage is being moved to its starting position at the right. Thus either disabling mechanism for the front and rear totalizers may be operated to the exclusion of the other and consequently, when the paper carriage is restored, it may restore either the front or rear totalizers, or both, or neither, at the will of the operator.

Having thus described my invention what I claim as new and desire to secure by Letters Patent is;

I claim:

1. In a calculating machine, the combination of actuating devices, plural groups of totalizer wheels, each group being composed of separate totalizer units into each of which numbers may be introduced to separately represent different computations, such as a total, a grand total, a multiplier, or a product, etc., means for separately and independently introducing such representative numbers into said totalizers to indicate different computations, independently operable devices for controlling the position of the different groups of totalizer wheels relative to said actuating devices, and independently operable escapement mechanism for each group of totalizer wheels whereby different totalizer units may be successively brought into coöperative relation to said actuating devices.

2. In a calculating machine, the combination of actuating devices, plural groups of totalizer wheels, each group comprising separate totalizer units into each of which numbers may be introduced to separately represent different computations, such as a total, a grand total, a multiplier, or a product, etc., means for separately and independently introducing such representative numbers into said totalizers to indicate different computations, independently operable devices for controlling the position of the different groups of totalizer wheels relative to said actuating devices, means for positioning groups of totalizer wheels so as to present different units thereof in coöperative relation to said actuating devices, and means for restoring said groups to their first or starting position 3. In a calculating machine, the combination of actuating devices, plural groups of totalizer wheels, each group being composed of separate totalizer units into each of which numbers may be introduced to separately represent different computations, such as a total, a grand total, a multiplier, or a product, etc., means for separately and independently introducing such representative numbers into said totalizers to indicate different computations, independently operable devices for controlling the position of the different groups of totalizer wheels relative to said actuating devices, means for positioning groups of totalizer wheels so as to present different units thereof in coöperative relation to said actuating devices, and means for simultaneously restoring said groups to their first or starting position.

4. In a calculating machine, the combination of actuating devices, plural groups of totalizer wheels, each group being composed of separate totalizer units into which numbers are introduced and accumulated, independently operable devices for controlling the position of the different groups of totalizer wheels relative to said actuating devices, means for positioning groups of totalizer wheels so as to present different units thereof in coöperative relation to said actuating devices, means for restoring said groups to their first or starting position, and means for disabling said restoring means.

5. In a calculating machine, the combination of actuating devices, plural groups of totalizer wheels, each group being composed of separate totalizer units into which numbers are introduced and accumulated, independently operable devices for controlling the position of the different groups of totalizer wheels relative to said actuating devices, means for positioning groups of totalizer wheels so as to present different units thereof in coöperative relation to said actuating devices, means for restoring said groups to their first or starting position, and independently operable disabling means for said restoring mechanism whereby one or the other, or both, restoring means may be rendered ineffective.

6. In a calculating machine, the combination of actuating devices, a group of totalizer wheels constituting independent units, means for placing a selected unit totalizer in coöperative relation to said actuating devices, and means for restoring said units to their original or starting position, said means comprising a movable bar, a block on said bar, and a spring pressed pin mounted in said block, said pin including in its path of travel a part operatively connected to said totalizer units.

7. In a calculating machine, the combination of actuating devices, a group of totalizer wheels constituting independent units, means for placing a selected unit totalizer in coöperative relation to said actuating devices, means for restoring said units to their original or starting position, said means comprising a movable bar, a block on said bar, a spring pressed pin mounted in said block, said pin including in its path of travel a part operatively connected to said totalizer units, and means for moving said pin out of operative relation to said bar whereby said bar may be moved independently of any restoration to the starting point of said totalizer units.

8. In a calculating machine, the combination of actuating devices, a series of totalizer wheels constituting different unit totalizers, a movable bar carrying a part for effecting the positioning of the different totalizer units in operative relation to said actuating devices, and means carried on said bar for restoring said totalizer units to their original or starting point, said means comprising a block mounted on the bar, a spring pressed pin mounted in the block, and a shouldered member carried by said pin, said shouldered member being designed to engage with the part movable with said totalizer units.

9. In a calculating machine, the combination of a series of actuating devices, totalizer wheels constituting separate totalizer units capable of being placed in operative relation to said actuating devices, an escapement mechanism for controlling the position of said totalizer units, said escapement mechanism comprising a pawl and a vibrating and sliding bar coöperating with said pawl, a traveling member provided with a block for vibrating said bar to operate the pawl when said traveling member is moving in one direction, and a block on said traveling member for engaging and sliding said bar when said traveling bar is moving in the opposite direction.

10. In a calculating machine, the combination of a series of actuating devices, totalizer wheels constituting separate totalizer units capable of being placed in operative relation to said actuating devices, an escapement mechanism for controlling the position of said totalizer units, said escapement mechanism comprising a pawl and a vibrating and sliding bar coöperating with said pawl, a traveling member provided with a block for vibrating said bar to operate the pawl when said traveling member is moving in one direction, a block on said traveling member for engaging and sliding the escapement bar when said traveling member is moving in the opposite direction, and means for disabling the block engaging parts when said traveling member is moving in the last mentioned direction, whereby said traveling member may be returned to its starting position without disturbing the position of said totalizer units.

In testimony whereof I hereunto affix my signature in the presence of two witnesses, this 21st day of April, 1917.

OTTO THIEME.